(12) United States Patent
Nishioka

(10) Patent No.: US 8,750,286 B2
(45) Date of Patent: Jun. 10, 2014

(54) NETWORK COMMUNICATION SYSTEM, COMMUNICATION DEVICE, NETWORK LINKAGE METHOD AND PROGRAM THEREOF

(75) Inventor: Itaru Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 13/255,985

(22) PCT Filed: Mar. 9, 2010

(86) PCT No.: PCT/JP2010/053854
§ 371 (c)(1),
(2), (4) Date: Sep. 12, 2011

(87) PCT Pub. No.: WO2010/106941
PCT Pub. Date: Sep. 23, 2010

(65) Prior Publication Data
US 2011/0317681 A1    Dec. 29, 2011

(30) Foreign Application Priority Data
Mar. 19, 2009  (JP) ................................ 2009-068374

(51) Int. Cl.
*H04L 12/66* (2006.01)
*H04J 14/00* (2006.01)

(52) U.S. Cl.
USPC .............................. 370/351; 398/57; 370/352

(58) Field of Classification Search
USPC ......... 370/352, 389, 400, 392, 396, 397, 535, 370/536, 351, 360, 395.21, 395.4, 410, 426, 370/222–227, 238, 258, 254–257; 398/45, 398/48, 49, 58, 107, 123, 138, 57, 59
See application file for complete search history.

(56) References Cited

U.S. PATENT DOCUMENTS 8,331,243 B2 * 12/2012 Mohan et al. .............. 370/241.1
2007/0286204 A1 * 12/2007 Ould-Brahim ............. 370/395.5
2009/0141730 A1 * 6/2009 Long ............................. 370/411

FOREIGN PATENT DOCUMENTS

| JP | 2002344409 A | 11/2002 |
|----|--------------|---------|
| JP | 2004328727 A | 11/2004 |
| JP | 2008527772 A | 7/2008 |

OTHER PUBLICATIONS

International Search Report for PCT/JP2010/053854 mailed Apr. 13, 2010.
H. Harai et al., "IP over WDM Networks with Inband Signaling and its Effective Route Decision", Technical Report of IECE,SSE99-169,IN99132, Mar. 2000, pp. 49-54.
I. Nishioka et al., "Inter-domain wavelength path control in multi-domain optical networks", Technical Report of IEICE, OCS2008-110, Jan. 2009, pp. 19-24.

* cited by examiner

*Primary Examiner* — Hanh N Nguyen

(57) ABSTRACT

A communication network system including a connectionless type communication network and a connection type communication network, wherein a communication device forming the communication network comprises a unit which transfers in-band control information to be exchanged on an in-band of the connectionless type communication network to other communication device through a virtual control link generated on an IP control network for controlling the connection type communication network and exchanges the in-band control information with other communication device, a unit which determines whether to generate a new connection for the connection type communication network based on the in-band control information to be exchanged, and a unit which generates a new connection for the connection type communication network in response to an instruction from the determination unit.

18 Claims, 14 Drawing Sheets

FIG. 8

S300 OPERATION OF CONTROL PACKET TRANSMISSION

TO PERIODICALLY TRANSMIT BPDU FRAME

S310

WHEN OPTICAL PATH EXISTS, TO TRANSMIT FRAME ALONG BPDU OPTICAL PATH

S320

AFTER RECEIVING BPDU FRAME, IP CONTROL UNIT MOUNTS BPDU ON IP CONTROL MESSAGE AND TRANSFERS OBTAINED RESULT TO OTHER DEVICE

OPERATION OF CONTROL PACKET RECEPTION

S330

TO RECEIVE IP CONTROL MESSAGE INCLUDING BPDU INFORMATION

S340

IN SECTION IN QUESTION, TO COMPUTE ROUTE OF WAVELENGTH PATH BETWEEN TRANSMISSION END AND RECEPTION END OF IP CONTROL MESSAGE AND CALCULATE ROUTE COST OF WAVELENGTH PATH

S350

TO CONVERT CALCULATED COST OF WAVELENGTH PATH INTO COST OF PACKET ACCORDING TO SET POLICY AND SET COST OF WAVELENGTH PATH AT BPDU FRAME TO TRANSMIT OBTAINED RESULT TO PACKET SWITCHING UNIT

S360

WHEN PACKET SWITCHING UNIT RECEIVES BPDU THROUGH WAVELENGTH PATH, TO COMPARE RESPECTIVE COSTS AND WHEN COST OF BPDU RECEIVED FROM IP CONTROL UNIT IS SMALLER, TO ASK IP CONTROL UNIT TO GENERATE WAVELENGTH PATH

S370

TO START TRANSMISSION OF ETHERNET PACKET BY USING SET WAVELENGTH PATH AND AT THIS TIME, WAVELENGTH PATH USED SO FAR IS HANDLED AS BLOCKING PORT OR REPLACEMENT PORT OR WHEN OTHER TRAFFIC FAILS TO USE THE PATH, TO NOTIFY IP CONTROL UNIT TO DELETE WAVELENGTH PATH

S380

TO TRANSMIT BPDU PACKET TO DOWNSTREAM DEVICE

NETWORK COMMUNICATION SYSTEM, COMMUNICATION DEVICE, NETWORK LINKAGE METHOD AND PROGRAM THEREOF

TECHNICAL FIELD

The present invention relates to a network communication system, a communication device, a method of linking a connection type communication network and a connectionless type communication network and a program thereof and, more particularly, a network communication system, a communication device, and network linkage method and program which enable connection type communication such as WDM or PBB-TE and connectionless type communication such as Ethernet to link with each other to automatically realize optimum network operation.

BACKGROUND ART

As traffic mainly of voice changes to traffic mainly of video or data, demanded is to flexibly accommodate packets in a transport network which transmits traffic in a wide range.

One of networks meeting such a demand is a hybrid network in which packets and paths exist together. Possible hybrid networks include a network formed of a packet network which aggregates packets from a user and a wavelength network which cuts through traffic between packet switches.

Example of such a hybrid network is shown in FIG. 14. The hybrid network shown in FIG. 14 is formed of an Ethernet network 1100 and a wavelength network 1200 and includes a packet switching unit (Ethernet switch) 1000-i (i=1, 2, . . . ). an optical switching unit (optical switch) 1001-j (j=1, 2, . . . ) and a user device 1002-k (k =1, 2, . . . ). The Ethernet switch 1000 and the optical switch 1001 are here structured as a single communication device having two kinds of switch functions in some case or as separate communication devices in other case.

In a communication system having such a structure, for linking two different networks, it is a common practice to set a connection of a wavelength path and communicate with a connectionless type Ethernet network by using the set wavelength path.

Example of related art of such a linkage method on a network is recited, for example, in Patent Literature 1. The linkage method recited in Patent Literature 1 operates to determine whether a cut-through path should be created or not by setting a wavelength path between a transmission source address SA (transmission end) and a destination address DA (reception end) with respect to an Ethernet traffic transfer path based on a traffic flow. Because of the following problems, such a system, however, fails to realize autonomous linkage between a connection type communication network and a connectionless type communication network.

Patent Literature 1: Japanese Patent Laying-Open No. 2004-328727 (pp. 9-12, FIG. 3 and FIG. 6).

First problem is that it is impossible to find a new destination MAC address (MAC-DA) on an Ethernet network.

The reason is that because an Ethernet broadcast packet is transferred along an already set wavelength path, no broadcast packet reaches a destination MAC address (MAC-DA) to which no wavelength path is connected. For example, in the structure shown in FIG. 14, when traffic is transferred with the Ethernet switch 1000-1 as a transmission source address SA and the Ethernet switch 1000-4 as a destination MAC address (MAC-DA), the destination MAC address (MAC-DA) of the Ethernet switch 1000-4 cannot be found because arrival through a wavelength path is impossible (i.e. no linkage on the Ethernet network).

Second problem is instability of a network. The reason is that because determination is made on setting/deletion of a new wavelength path based on a traffic flow, when the volume of traffic changes heavily, setting/deletion of a wavelength path occurs frequently to change a network topology of the Ethernet frequently.

(Object of the Invention)

An object of the present invention is to provide a network communication system, a communication device, and network linkage method and program which realize automatic and stable network operation in a network having connection type communication and connectionless type communication existing together.

SUMMARY

According to a first exemplary aspect of the invention, a communication network system including a connectionless type communication network and a connection type communication network, wherein a communication device forming the communication network includes a unit which transfers in-band control information to be exchanged on an in-band of the connectionless type communication network to other communication device through a virtual control link generated on an IP control network for controlling the connection type communication network and exchanges the in-band control information with other communication device, a unit which determines whether to generate a new connection for the connection type communication network based on the in-band control information to be exchanged, and a unit which generates a new connection for the connection type communication network in response to an instruction from the determination unit.

According to a second exemplary aspect of the invention, a network linkage method of a network communication system formed of a connectionless type communication network and a connection type communication network, includes exchanging in-band control information to be exchanged on an in-band of the connectionless type communication network between communication devices through a virtual control link generated on an IP control network for controlling the connection type communication network; and determining whether to generate a new connection for the connection type communication network based on the in-band control information to be exchanged.

According to a third exemplary aspect of the invention, a communication device forming a network communication system including a connectionless type communication network and a connection type communication network, includes a unit which transfers in-band control information to be exchanged on an in-band of the connectionless type communication network to other communication device through a virtual control link generated on an IP control network for controlling the connection type communication network and exchanges the in-band control information with other communication device, a unit which determines whether to generate a new connection for the connection type communication network based on the in-band control information to be exchanged, and a unit which generates a new connection for the connection type communication network in response to an instruction from the determination unit.

According to a fourth exemplary aspect of the invention, a program operable on a computer device forming a network communication system including a connectionless type communication network and a connection type communication network, which causes the computer device to execute a processing of transferring in-band control information to be exchanged on an in-band of the connectionless type communication network to other communication device through a virtual control link generated on an IP control network for controlling the connection type communication network and exchanging the in-band control information with other communication device, a processing of determining whether to generate a new connection for the connection type communication network based on the in-band control information to be exchanged, and a processing of generating a new connection for the connection type communication network.

First effect is to enable autonomous linkage between a connection type communication network and a connectionless type communication network.

Second effect is to enable an optimum stable connection to be set for a connectionless type communication network.

BRIEF DESCRIPTION OF THE DRAWINGS

FIG. 8 is a flow chart showing Ethernet topology generation processing operation according to the first exemplary embodiment;

EXEMPLARY EMBODIMENT

Next, exemplary embodiments of the present invention will be described in detail with reference to the drawings.
(First Exemplary Embodiment)

Figure 1:
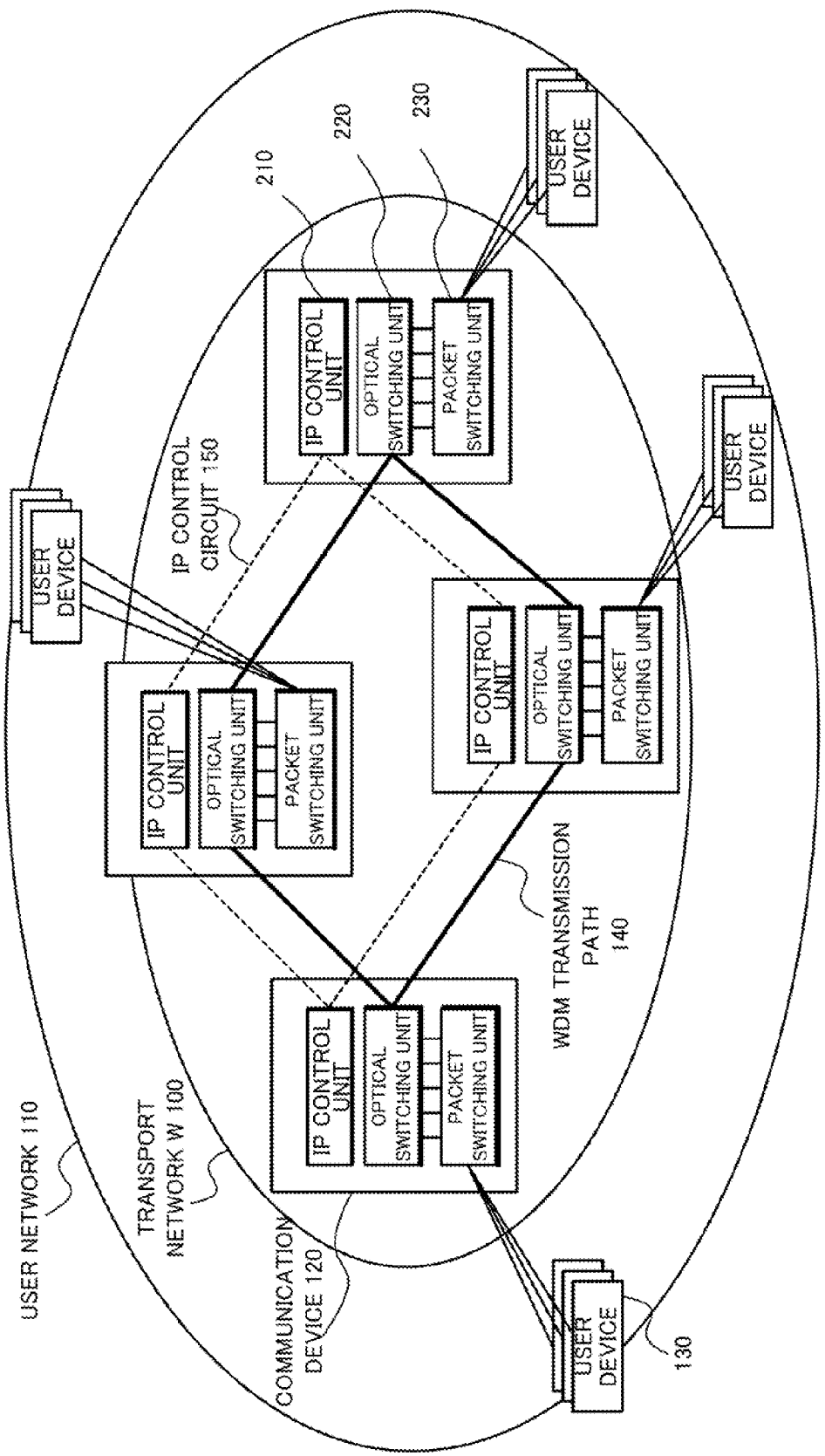
FIG. 1 is a block diagram showing an example of a structure of an Ethernet and WDM (Wavelength Division Multiplexing) coexisting network according to a first exemplary embodiment of the present invention.
Figure 2:
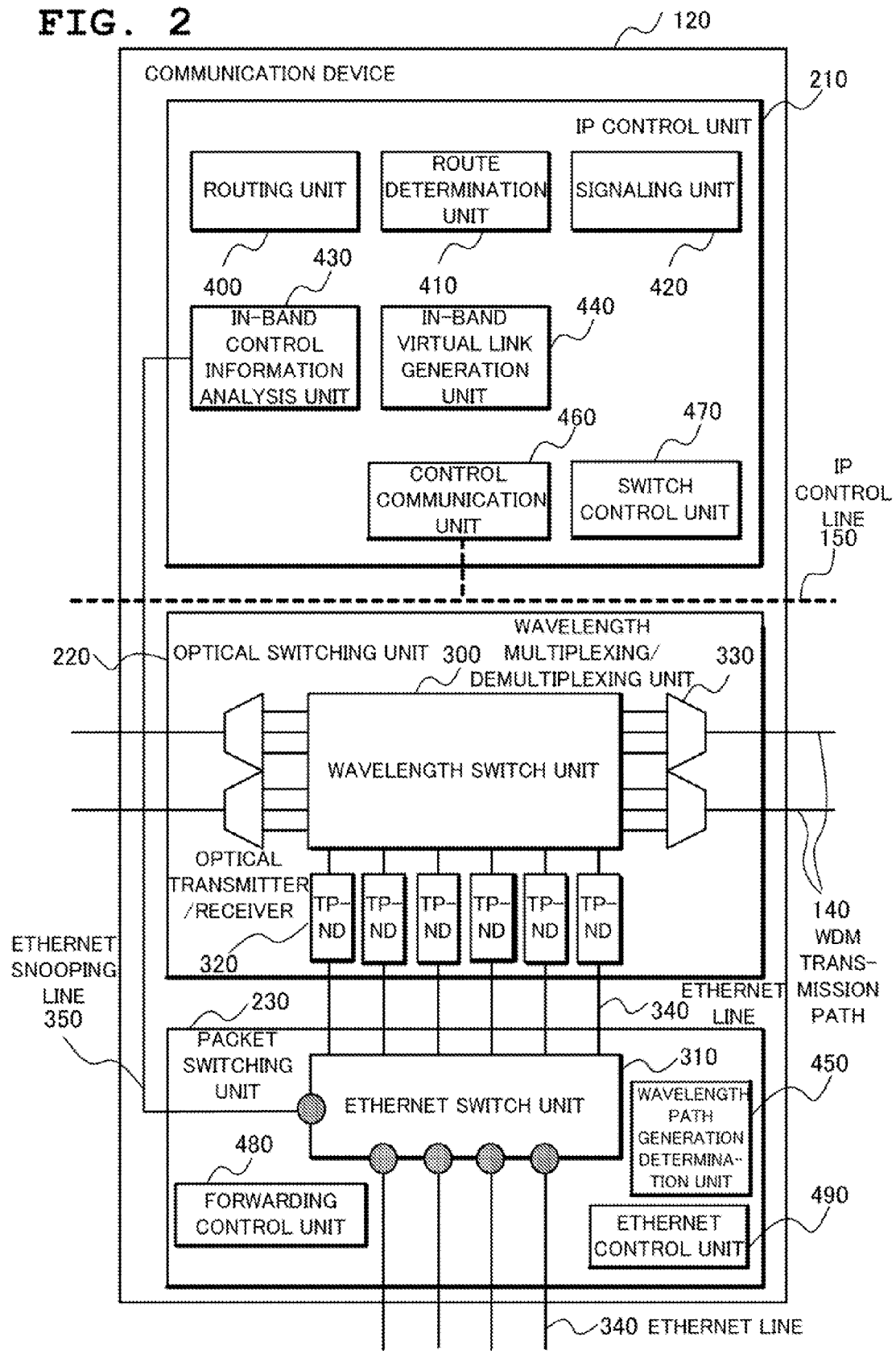
FIG. 2 is a block diagram showing an example of a structure of a communication device according to the first exemplary embodiment.

FIG. 1 shows an example of a structure of an Ethernet•WDM coexisting network according to a first exemplary embodiment of the present invention. FIG. 2 shows an example of a structure of a communication device forming the Ethernet•WDM coexisting network. In the exemplary embodiments of the present invention, the Ethernet shown in the network structure example is a registered trademark. In the description of the exemplary embodiments of the present invention, connection and path are regarded as a synonym.

The Ethernet•WDM coexisting network shown in FIG. 1 includes a transport network 100 on the side which provides network service and a user network 110 on the side which receives service.

A communication device 120 forming the transport network 100 comprises an optical switching unit 220 which executes switching on a wavelength basis, a packet switching unit 230 which executes switching on a packet basis and an IP control unit 210 which controls the optical switching unit 220 and the packet switching unit 230.

A plurality of communication devices 120 are connected with each other by a WDM transmission path 140 which connects the optical switching units 220 and an IP control line 150 which connects the IP control units 210. The IP control line 150 here is formed of an out-of-band line different from a line on which main signal traffic flows. Structure of the IP control line 150 may be either one using a different wavelength line in the same fiber as that of the WDM transmission line 140 (in-fiber structure) or one using a line different from the WDM transmission path 140 (out-of-fiber structure).

Here, a network formed by the optical switching unit 220 is a connection type communication network and a network formed by the packet switching unit 230 is a connectionless communication network.

Next, detailed structure of the communication device 120 will be described with reference to FIG. 2.

The optical switching unit 220 of the communication device 120 comprises a wavelength switch unit 300 which switches a path on a wavelength basis, a wavelength multiplexing/demultiplexing unit 330 which multiplexes/demultiplexes a wavelength on a WDM transmission path 140 basis, and a plurality of optical transmitters/receivers 320.

The packet switching unit 230 of the communication device 120 comprises an Ethernet switch unit 310 which switches a path on a packet basis, an Ethernet line 340 to be connected to a user device 130 or an optical transmitter/receiver, an Ethernet snooping line 350 which connects the Ethernet switch 310 and the IP control unit 210, a forwarding control unit 480 which converts MAC (Media Access Control) address information between the user network 110 and the transport network 100 and holds forwarding information for the determination of an output interface based on the MAC address information as well as giving a switching instruction to the Ethernet switch unit 310, an Ethernet control unit 490 which executes control of broadcasting, bridging and the like, and a wavelength path generation determination unit 450 which determines whether a wavelength path should be generated or not.

In the present exemplary embodiment, for separating the user network 110 and the transport network 100, the capsulation technique called MAC-in-MAC is used. The capsulation technique, which is called PBB (Provider Backbone Bridge), is a technique of capsuling an Ethernet data packet from the user device 130 by an Ethernet frame used in the transport network 100 and releasing the capsulation on a reception end. Since use of such a technique enables the user network 110 and the transport network 100 to be separated, different operation modes are applicable to the respective networks.

The IP control unit 210 of the communication device 120 comprises a routing unit 400 which exchanges topology information with the IP control unit of other communication device, a route determination unit 410 which determines an optimum route of an optical path in a requested section by using topology information, a signaling unit 420 which sets an optical path according to a determined route, a switch control unit 470 which controls the wavelength switch 300 and the Ethernet switch unit 310, and a control communication unit 460 which transmits and receives an IP control message.

The IP control unit 210 further comprises an in-band control information analysis unit 430 which receives control information of the Ethernet and analyzes the same, and an in-band virtual link generation unit 440 which generates a virtual link on an IP network which controls a connection-type communication network to make the packet switching unit 230 and the packet switching unit of other communication device be directly connected with each other.

(Operation of the First Exemplary Embodiment)

Figure 3:
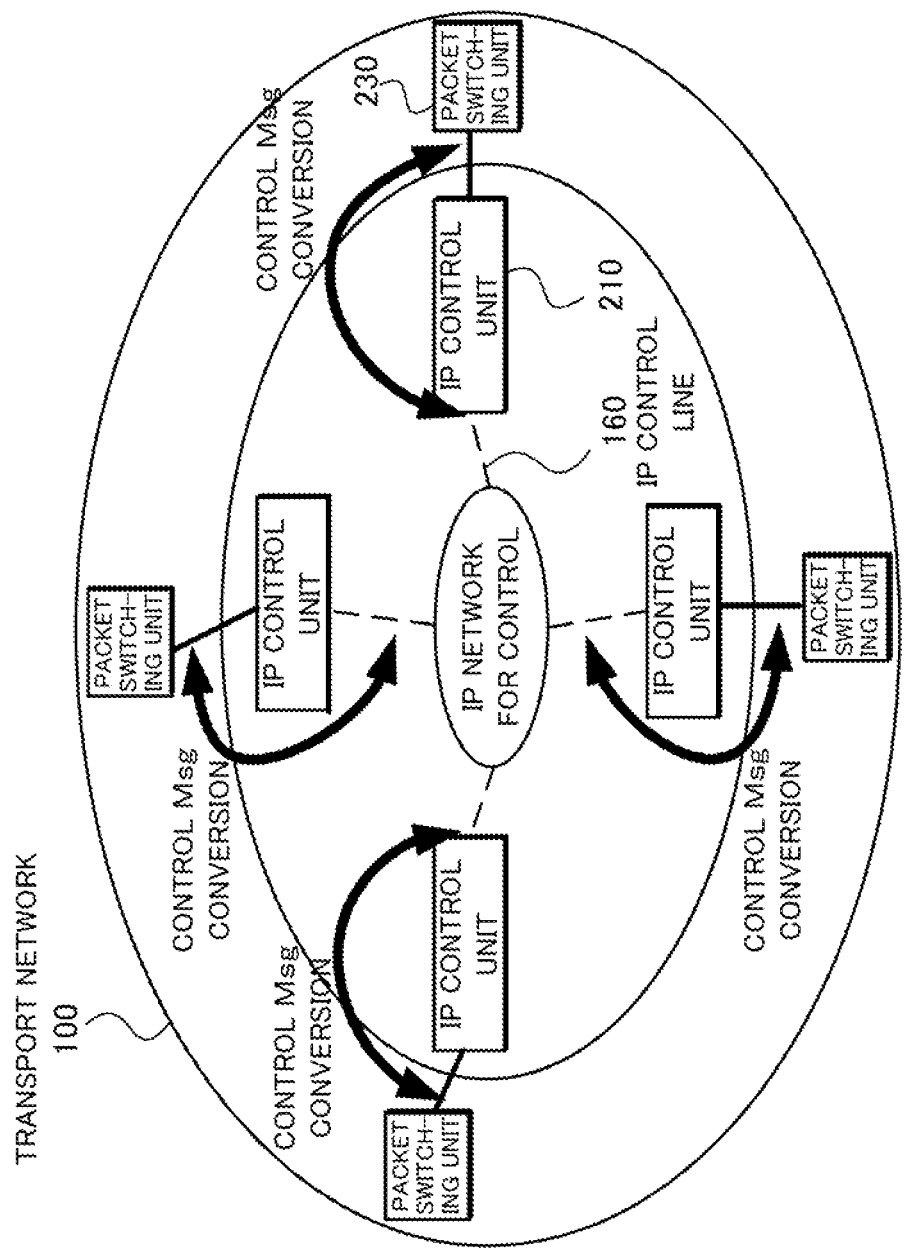
FIG. 3 is a diagram showing outlines of linkage operation in an Ethernet•WDM coexisting network according to the first exemplary embodiment.

Outlines of operation of thus structured communication device 120 will be described with reference to FIG. 3.

Since an Ethernet control frame flowing on an Ethernet line is exchanged on the same Ethernet line (in-band line) as that of main signal traffic, connection to other communication device is not allowed until a wavelength path is set. For solving the problem, a control frame flowing on the Ethernet is mounted on the IP control unit 210 to virtually connect to the device through a control IP network (IP control line 150). In other words, operation is executed to exchange a control frame on an in-band line through an out-of-band IP control line 150.

Figure 4:
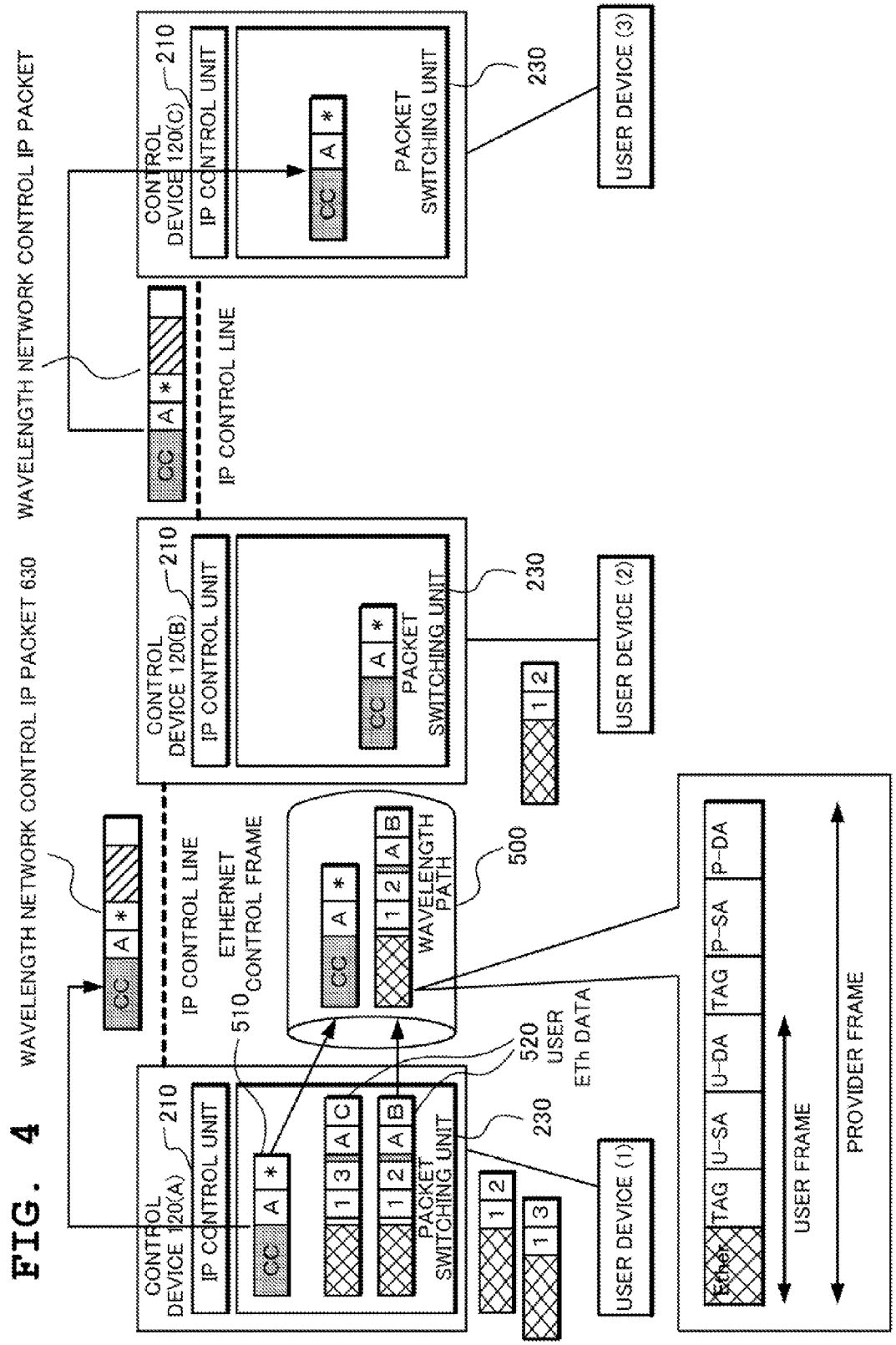
FIG. 4 is a diagram showing a flow of a control packet according to the first exemplary embodiment.

FIG. 4 shows in detail a flow of exchange of a control frame on an in-band line through the out-of-band IP control line 150.

When a wavelength path is already set by the packet switching unit 230 of a communication device 120(A) (a wavelength path 500 in this example), an Ethernet control frame 510 is transferred to the packet switching unit 230 of a communication device 120(B) as a connection destination through the wavelength path 500.

At the same time, the Ethernet control frame 510 is converted into a wavelength network control IP packet 630 flowing in the control IP network (IP control line 150) which controls a wavelength path through the IP control unit 210 and sent to the packet switching units 230 of the communication devices 120(B) and 120(C). Such control enables switching of an Ethernet control packet with the communication device 120 in which a wavelength path is yet to be set.

Detailed description will be made of two control operations of MAC-DA (Destination Address) finding processing and Ethernet tree topology generation processing in a case where the transport network 100 executes an Ethernet control method according to the above-described operation.

(Destination MAC Address (MAC-DA) Finding Processing)

Figure 6:
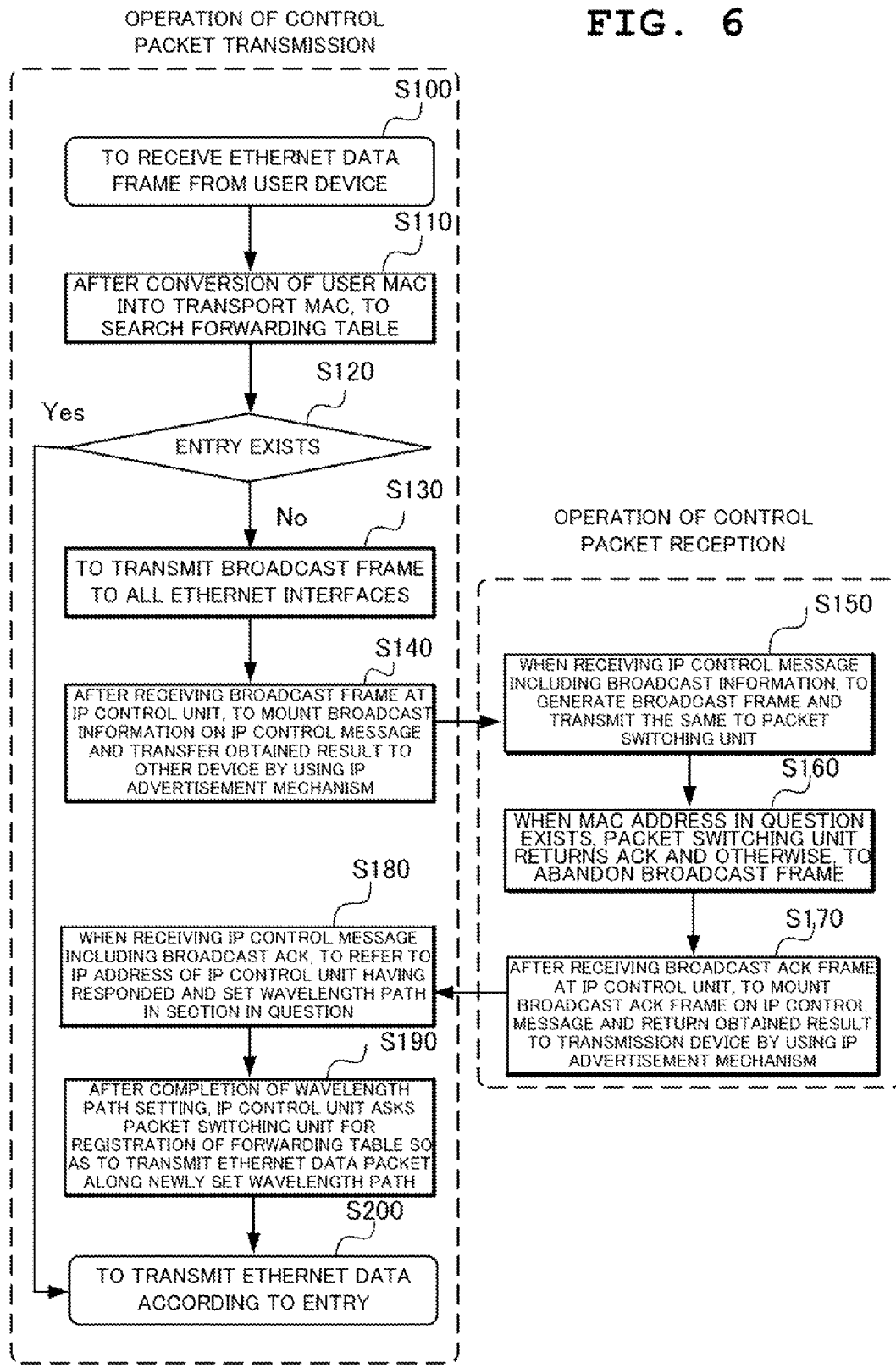
FIG. 6 is a flow chart showing MAC-DA finding processing operation according to the first exemplary embodiment.

Description will be made of operation in the destination MAC address (MAC-DA) finding processing shown in FIG. 6 with reference to the structure illustrated in FIG. 2.

First, description will made of processing of transmitting a broadcast frame by the communication device 120.

When receiving an Ethernet data frame from the user device 130 (Step S100), convert a user MAC-DA as an address space of the user network 110 to a transport MAC-DA as an address space of the transport network 100 with reference to the forwarding control unit 480.

Next, the converted transport MAC-DA (assumed here to be an address "MAC-CC" held by the communication device 120(C)) refers to a forwarding table of the forwarding control unit 480 (Step S110). When an entry exists in the forwarding table, transmit the data frame according to the entry to end the processing (Steps S120 and S200).

Figure 5:
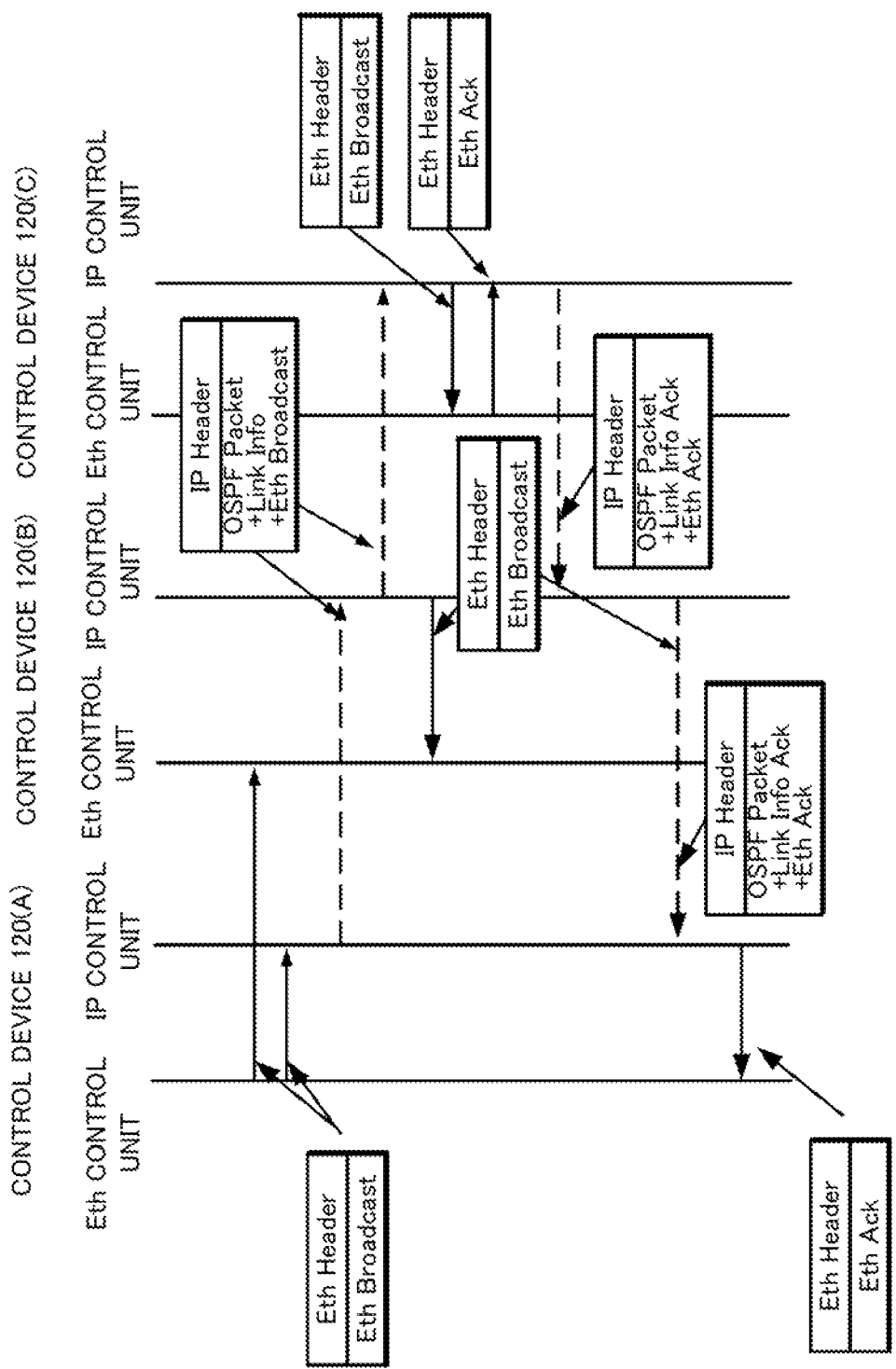
FIG. 5 is a sequence diagram showing a flow of a control packet in MAC-DA finding processing according to the first exemplary embodiment.

When no entry exists, transmit a broadcast frame including the converted transport MAC-DA to all the Ethernet interfaces (Step S130). With reference to FIG. 4 and FIG. 5 here, since a wavelength path is set between the communication devices 120(A) and 120(B), the broadcast frame is received by the IP control unit 210 of the communication device 120(A) and the packet switching unit 230 of the communication device 120(B).

The IP control unit 210 having received the broadcast frame through the Ethernet snooping line 350 analyzes broadcast information mounted on the broadcast frame by means of the in-band control information analysis unit 430. Thereafter, the in-band virtual link generation unit 440 mounts the broadcast information on the IP control message and multiplexes the same, and transfers the obtained result to other communication device by using an IP advertisement mechanism (routing unit 400) (Step S140).

Usable as an IP advertisement mechanism are, for example, OSPF (Open Shortest Path First), IS-IS (Intermediate System to Intermediate System) and RIP (Rouging Information Protocol) (S140).

Next, processing of the communication device 120 having received a broadcast frame will be described.

When the routing unit 400 of the IP control unit 210 of the communication device receives an IP control message including broadcast information through the IP control line 150, the in-band control information analysis unit 430 extracts broadcast information to generate a broadcast frame. The generated broadcast frame is transmitted to the packet switching unit 230 through the Ethernet snooping line 350 (Step S150).

The packet switching unit 230, when the MAC-DA included in the broadcast frame exists in its own interface, transmits an ACK (ACKnowledgement) to the IP control unit 210. When the MAC-DA fails to exist or when an ACK is already transmitted through a wavelength path, abandon the broadcast frame to end the processing (Step S160).

The IP control unit 210 having received the ACK transmits an IP control message including the ACK to a transmission source communication device by the same procedure as that of the transmission by using an IP advertisement mechanism by means of the in-band control information analysis unit 430 and the in-band virtual link generation unit 440 (Step S170).

With reference to FIGS. 4 and 5, although the broadcast frame is received by the communication devices 120(B) and 120(C), since the communication device 120(B) fails to hold the MAC-DA, it abandons a received broadcast frame.

Lastly, description will be made of processing of the communication device 120 on the transmission side having received the ACK.

When the routing unit 400 of the IP control unit 210 receives an IP control message including ACK, the wavelength path generation determination unit 450 of the packet switching unit 230 refers to the IP address of the communication device 120(C) as a transmission source of the IP control message including ACK to determine to set a wavelength path between the communication device 120(A) and the communication device 120(C) and instructs the IP control unit 210 on the determination. Then, the route determination unit 410 and the signaling unit 420 generate the wavelength path 500 (Step S180).

When wavelength path setting is completed, the IP control unit 210 sets the forwarding control unit 480 to transmit an Ethernet data frame directed to the address "MAC-CC" along the newly set wavelength path 500 (Step S190) and the packet switching unit 230 transmits a data frame directed to the destination MAC address MAC-DA in question (Step S200).

The foregoing operation enables Ethernet address solution using the IP control line 150 even when no wavelength path is set.

(Ethernet Tree Topology Generation Processing)

Next, with reference to the structure shown in FIG. 2, description will be made of operation of Ethernet topology generation processing illustrated in FIG. 8.

First, description will be made of processing of transmitting a BPDU (Bridge Protocol Data Unit) frame by the communication device 120.

The communication device 120 as a route bridge of the Ethernet periodically transmits a BPDU frame at fixed intervals (Step S300). The BPDU frame is transmitted along the set wavelength path 500 (Step S310) and transmitted to the IP control unit 210 through the Ethernet snooping line 350 as well.

The IP control unit 210 having received the BPDU frame mounts information of the BPDU on an IP control message and transfers the same to other adjacent communication device 120 through the routing unit 400 by means of the in-band control information analysis unit 430 and the in-band virtual link generation unit 440 (Step S320).

Figure 7:
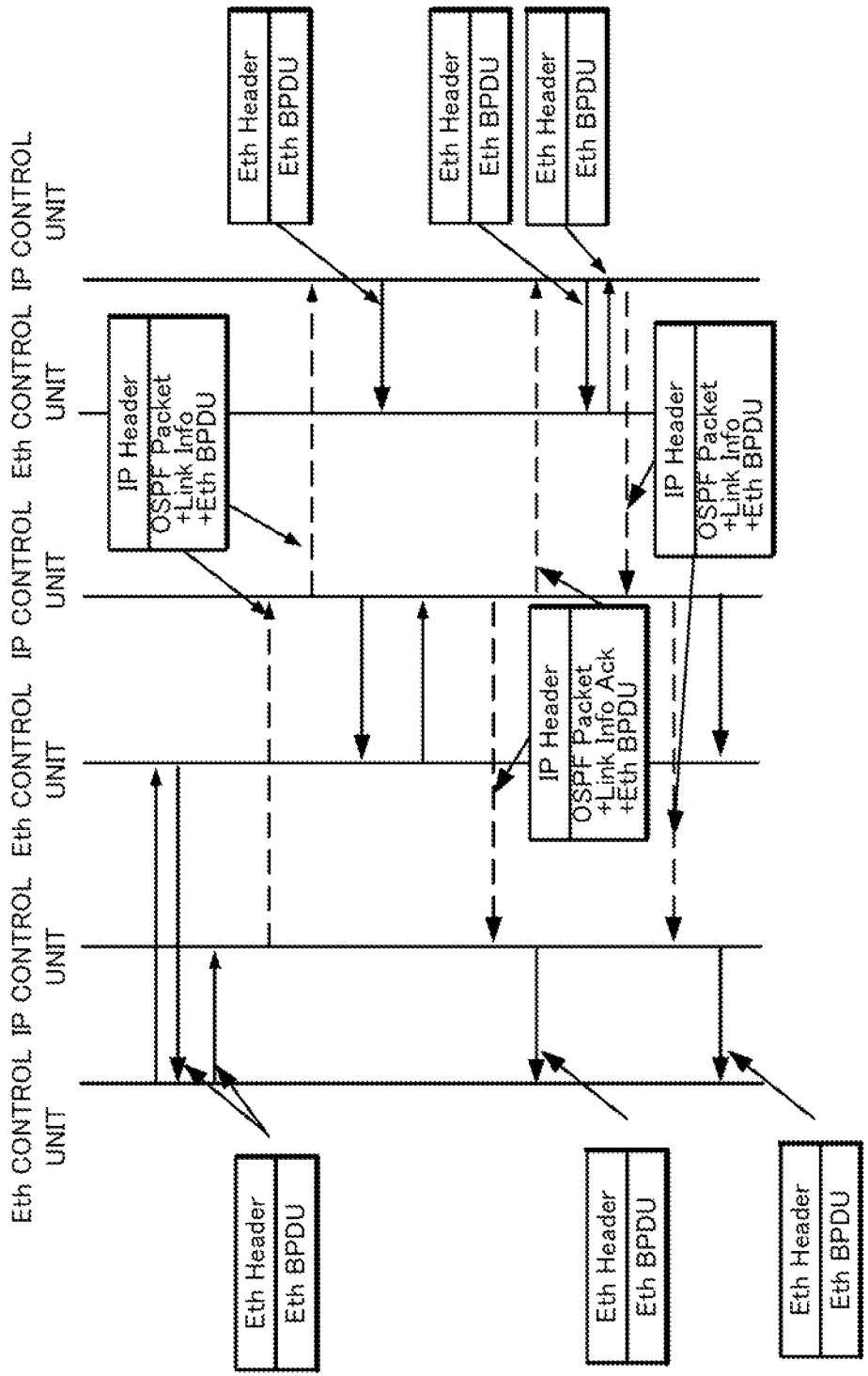
FIG. 7 is a sequence diagram showing a flow of a control packet in Ethernet topology generation processing according to the first exemplary embodiment.

When receiving a BPDU frame from other communication device 120, also execute processing of adding costs to the frame and transferring the obtained frame to other communication device (Step S380). In the operation examples shown FIG. 4 and FIG. 7, a BPDU frame is transferred by a route through the wavelength path 500 and a route through the IP control line 150.

Next, description will be made of processing executed when the communication device 120 receives an IP control message including information of a BPDU.

When receiving an IP control message including BPDU information (Step S330), the route determination unit 410 of the IP control unit 210 computes a route of the wavelength path 500 between the communication device 120 as a receiver and the communication device 120 as a transmitter of the IP control message to calculate costs required when the wavelength path 500 is set (Step S340).

Next, the in-band virtual link generation unit 440 of the IP control unit 210 converts the calculated costs of the wavelength path 500 into costs at the Ethernet network according to policy set in advance, sets costs of the wavelength path 500 converted into a BPDU frame through the in-band control information analysis unit 430 and transmits the same to the packet switching unit 230 (Step S350).

When the packet switching unit 230 receives a BPDU frame through the wavelength path 500, the wavelength path generation determination unit 450 compares the respective costs and when the cost of the BPDU frame advertised through the IP control line 150 is smaller, instructs the IP control unit 210 to generate a new wavelength path 500 (Step S360).

When the wavelength path 500 is newly set by the IP control unit 210, the Ethernet data frame will be transmitted through the wavelength path 500 (Step S370). Here, in the packet switching unit 230, a port to which the wavelength path 500 used so far is connected is handled as a blocking port or a replacement port so as to prevent generation of a loop by a common Ethernet control method. Alternatively, when no other VLAN traffic flows, instruct the IP control unit 210 to delete the wavelength path 500.

Synchronizing a starting time of use of a generated wavelength path 500 and a port blocking time enables switching without cutting off user traffic, thereby preventing the transport network 100 from becoming unstable.

By repeatedly executing the above-described Ethernet topology generation operation at each device, an optimum wavelength path can be set for Ethernet traffic.

(Effects of the First Exemplary Embodiment)

The above-described first exemplary embodiment achieves the following effects.

First effect is to enable autonomous linkage of a connection type communication network and a connectionless type communication network. The reason is that exchanging control information transferred by an in-band through an IP network which controls a connection type communication network enables autonomous setting of the wavelength path 500 in a section where none of the wavelength path 500 exists.

Second effect is to enable setting of an optimum stable wavelength path 500 in a connectionless type communication network. The reason is that the wavelength path generation determination unit 450, which determines whether the wavelength path 500 should be newly set or not based on cost information of a route, sets the wavelength path 500 taking optimality of a connectionless type communication network into consideration.

(Second Exemplary Embodiment)

Next, a second exemplary embodiment of the present invention will be described in detail with reference to the drawings.

Figure 9:
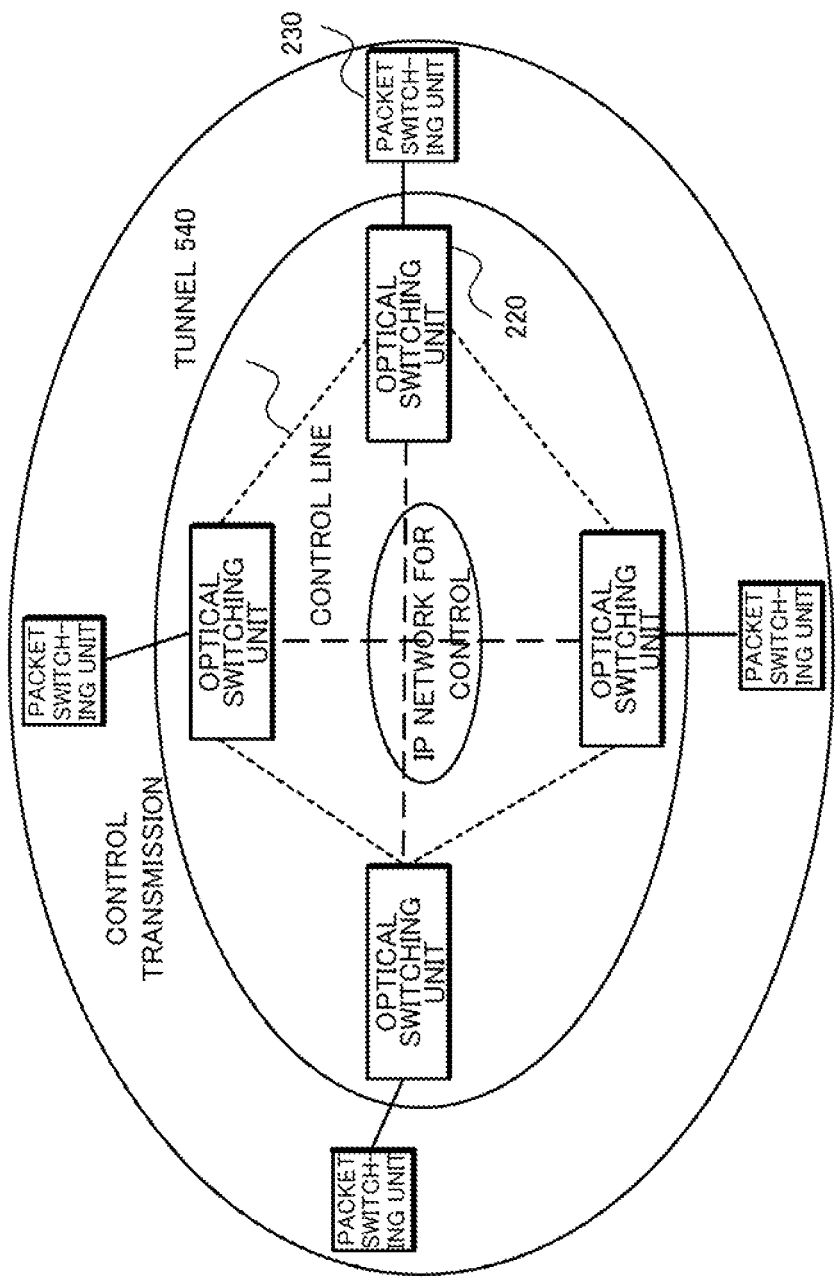
FIG. 9 is a diagram showing outlines of linkage operation according to a second exemplary embodiment of the present invention.

FIG. 9 is a diagram showing an outline of operation according to the second exemplary embodiment of the present invention. In the second exemplary embodiment of the present invention, the system operates to transparently exchange a control frame flowing on the Ethernet by a tunnel generated on the IP control network and a control frame on an in-band line through an out-of-band IP control line. Tunnel here represents a virtual link set in advance by a network manager by such a method as Ethernet/IP or Ethernet/SSL (Secure Socket Layer).

Structures of the transport network 100 and the communication device 120 according to the second exemplary embodiment are the same as those of the first exemplary embodiment with the only difference in that the in-band virtual link generation unit 440 has a function of not converting a message but generating a tunnel.

Unlike the first exemplary embodiment, the second exemplary embodiment therefore enables an Ethernet control frame without conversion to be transferred to the communication device 120 in which no wavelength path is set.

Figure 10:
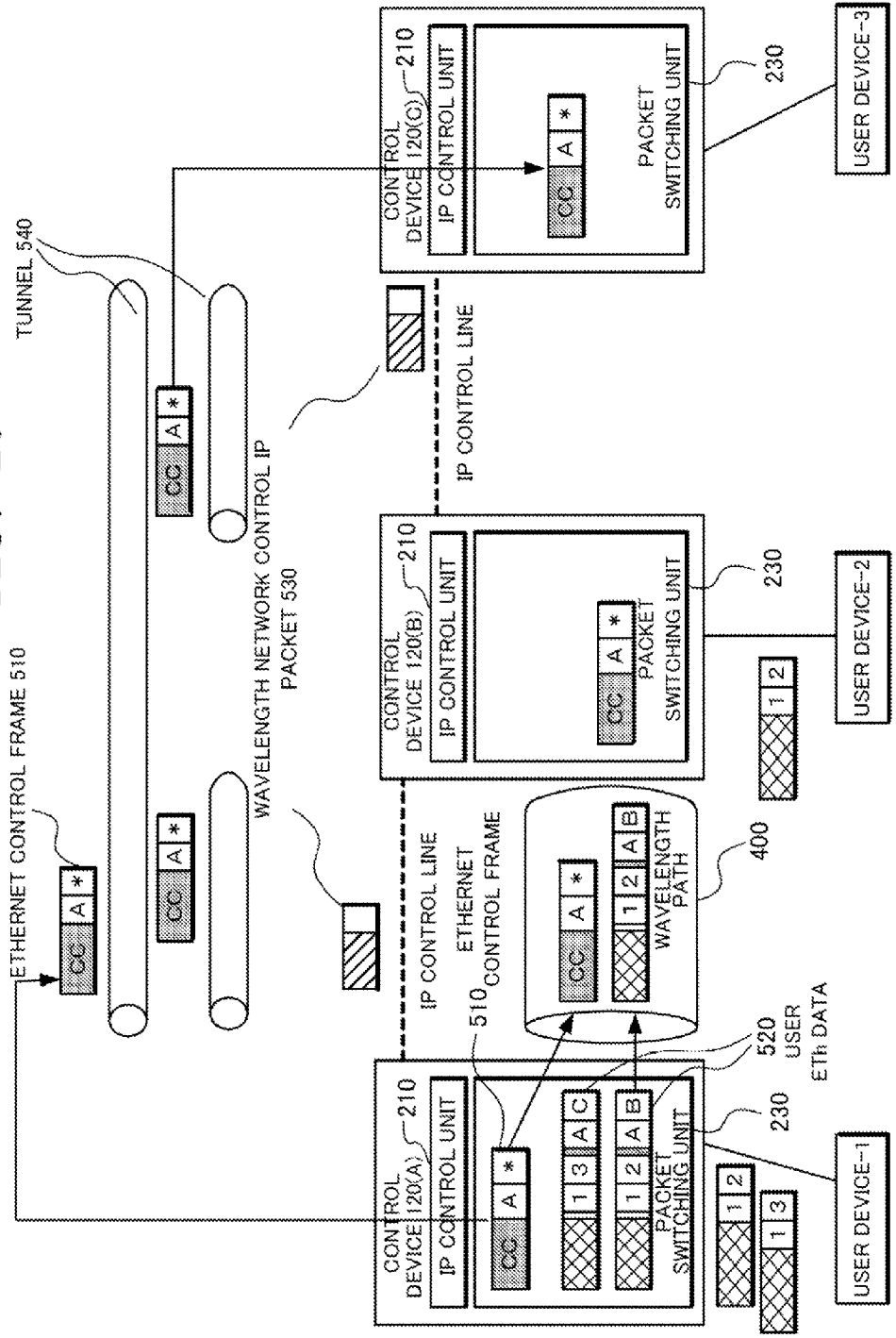
FIG. 10 is a diagram showing a flow of a control packet according to the second exemplary embodiment.

More specific operation according to the second exemplary embodiment is shown in FIG. 10. FIG. 10 shows details of a flow of exchange of a control frame on an in-band line through the out-of-band IP control line 150.

When a wavelength path is already set by the packet switching unit 230 of the communication device 120(A) (the wavelength path 500 in this example), the Ethernet control frame 510 is transferred to the packet switching unit 230 of the communication device 120(B) as a connection destination through the wavelength path 500.

At the same time, the Ethernet control frame 510 is transferred through an IP network which controls the wavelength path 500 through the IP control unit 210. For the transfer in an out-of-band IP network here, a tunnel 540 is formed to have a full-mesh in advance among all the communication devices. Ethernet control frames are all transparently transferred through the tunnel 540. Such arrangement enables an Ethernet control frame to be exchanged between communication devices in which none of the wavelength path 500 is set.

Since the second exemplary embodiment needs no control frame to be converted into an IP control message, the same effects as those of the first exemplary embodiment can be achieved by using the routing unit 400 completely conformed to such standards as OSPF, IS-IS and RIP.

(Third Exemplary Embodiment)

Next, a third exemplary embodiment of the present invention will be described in detail with reference to the drawings.

Figure 11:
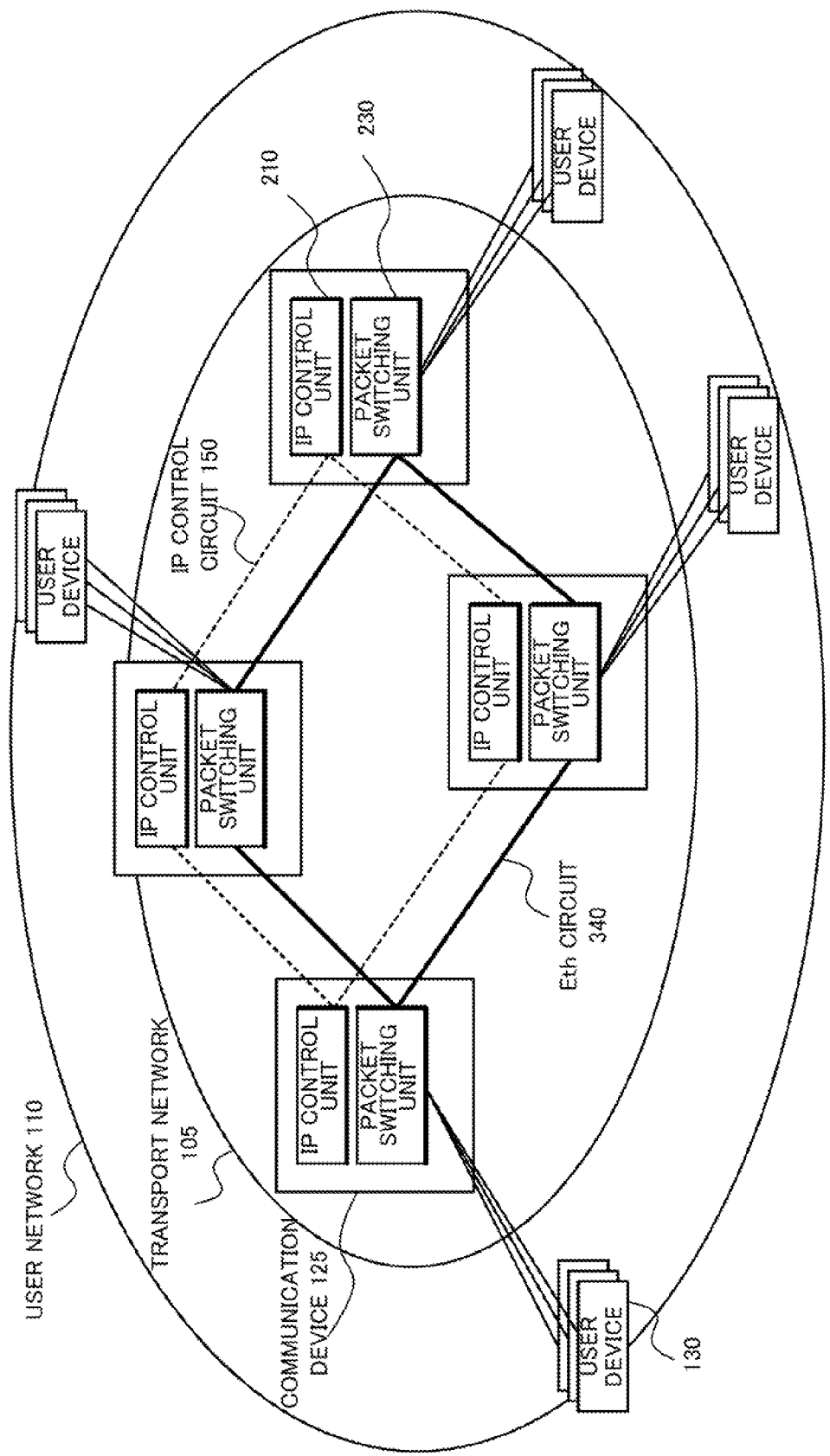
FIG. 11 is a block diagram showing an example of a structure of a connection type and connectionless type coexisting network according to a third exemplary embodiment of the present invention.
Figure 12:
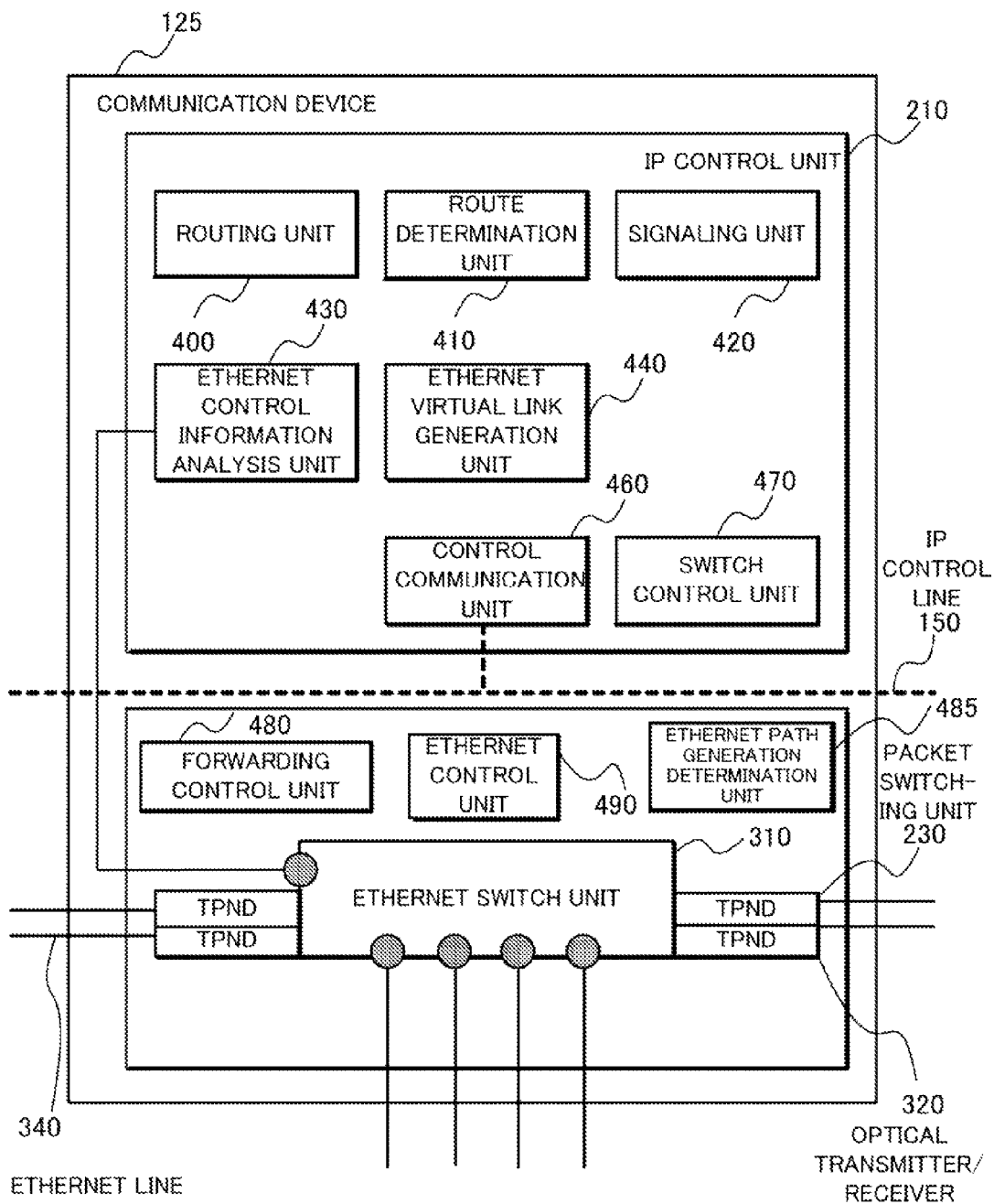
FIG. 12 is a block diagram showing an example of a structure of a communication device according to the third exemplary embodiment.

FIG. 11 and FIG. 12 show an example of a network structure and an example of a communication device structure according to the third exemplary embodiment of the present invention. The third exemplary embodiment of the present invention employs a structure obtained by applying the first and second exemplary embodiments between a transport network and a user network.

In FIG. 11, a transport network 105 is formed of a plurality of communication devices 125 including the IP control unit 210 and the packet switching unit 230.

Capsulation by MAC-in-MAC is made between the transport network 105 and the user network 110 which are independent from each other in operation. With such a network structure, in the transport network 105, an Ethernet path is set by the IP control unit 210. In other words, in the transport network 105, none of the Ethernet control methods described in the first and second exemplary embodiments will be applied. In the user network 110, the Ethernet control methods described in the first and second exemplary embodiments are applied. As exchange of the Ethernet control information using the IP control line 150, either of the message conversion method (first exemplary embodiment) and the frame tunnel method (second exemplary embodiment) are applicable.

FIG. 12 shows an example of a structure of the communication device 125. Differences from the communication devices 120 according to the first and second exemplary embodiments are provision of none of the optical switching unit 220 and replacement of the wavelength path generation determination unit 450 by an Ethernet path generation determination unit 485.

Furthermore, although the IP control circuit 150 is a line physically the same line because of being structured by an in-band, it is a line logically different from an Ethernet network which carries main signal traffic. Here, a logically different IP control line is also referred to as an out-of-band line.

With this structure, description will be made of a difference from the first and second exemplary embodiments with respect to two control operations of MAC-DA finding and Ethernet tree topology generation. The virtual link generation unit on the IP control line 150 uses the same message exchanging method as that of the first exemplary embodiment.

An Ethernet control frame exchanged on the user network 110 is analyzed by the in-band control information analysis unit 430 and exchanged by the in-band virtual link generation unit 440 through the IP control line 150. Based on the exchanged Ethernet control information, the Ethernet path generation determination unit 485 determines whether an Ethernet path should be generated or not and when necessary, generates an Ethernet path by using the same manner as those described in the first and second exemplary embodiments.

It can be seen from the foregoing operation that the method according to the third exemplary embodiment is applicable not only between a WDM network and an Ethernet network but also between a user network and a transport network.

Figure 13:
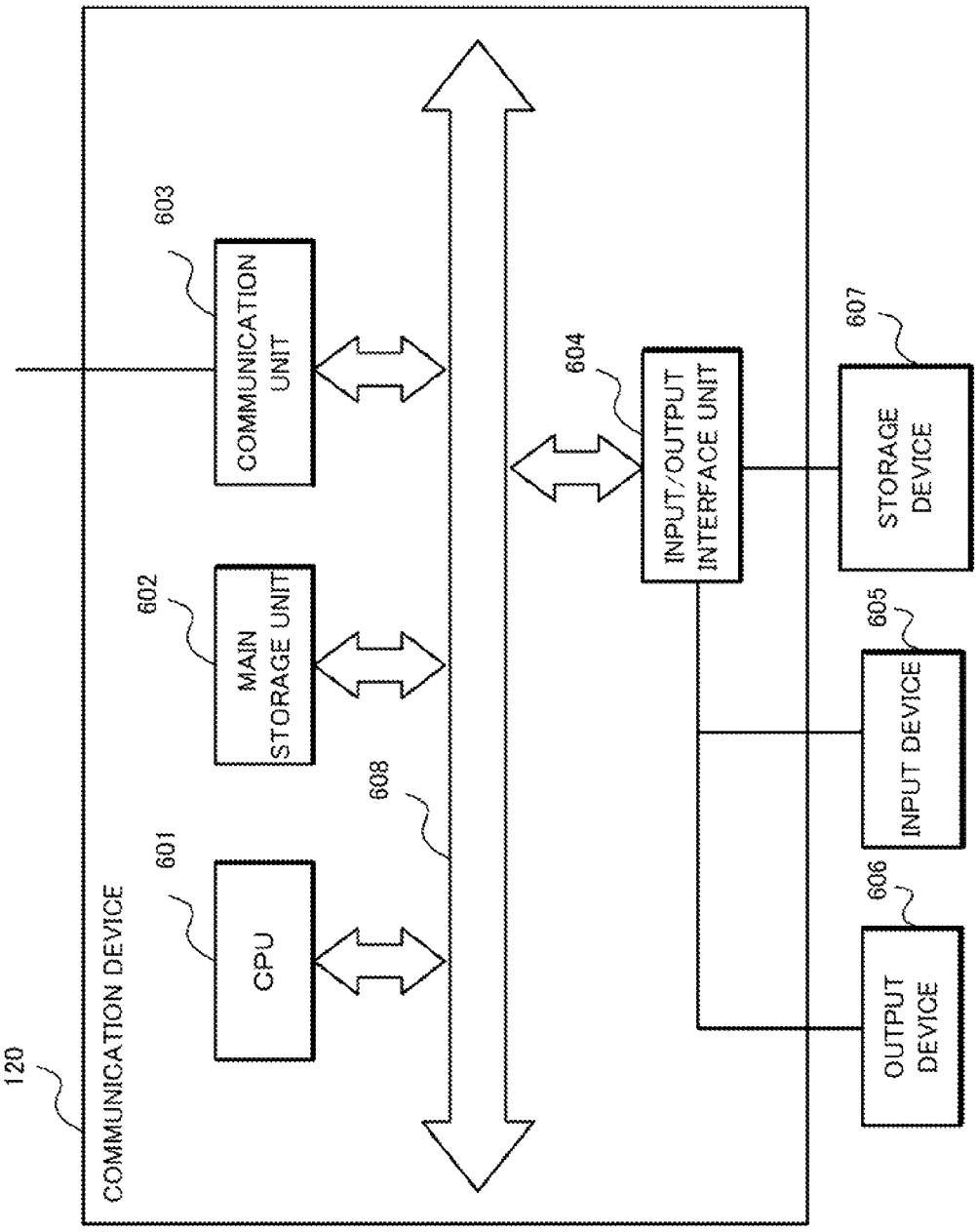
FIG. 13 is a block diagram showing an example of a hardware structure of a communication device according to the present invention.
Figure 14:
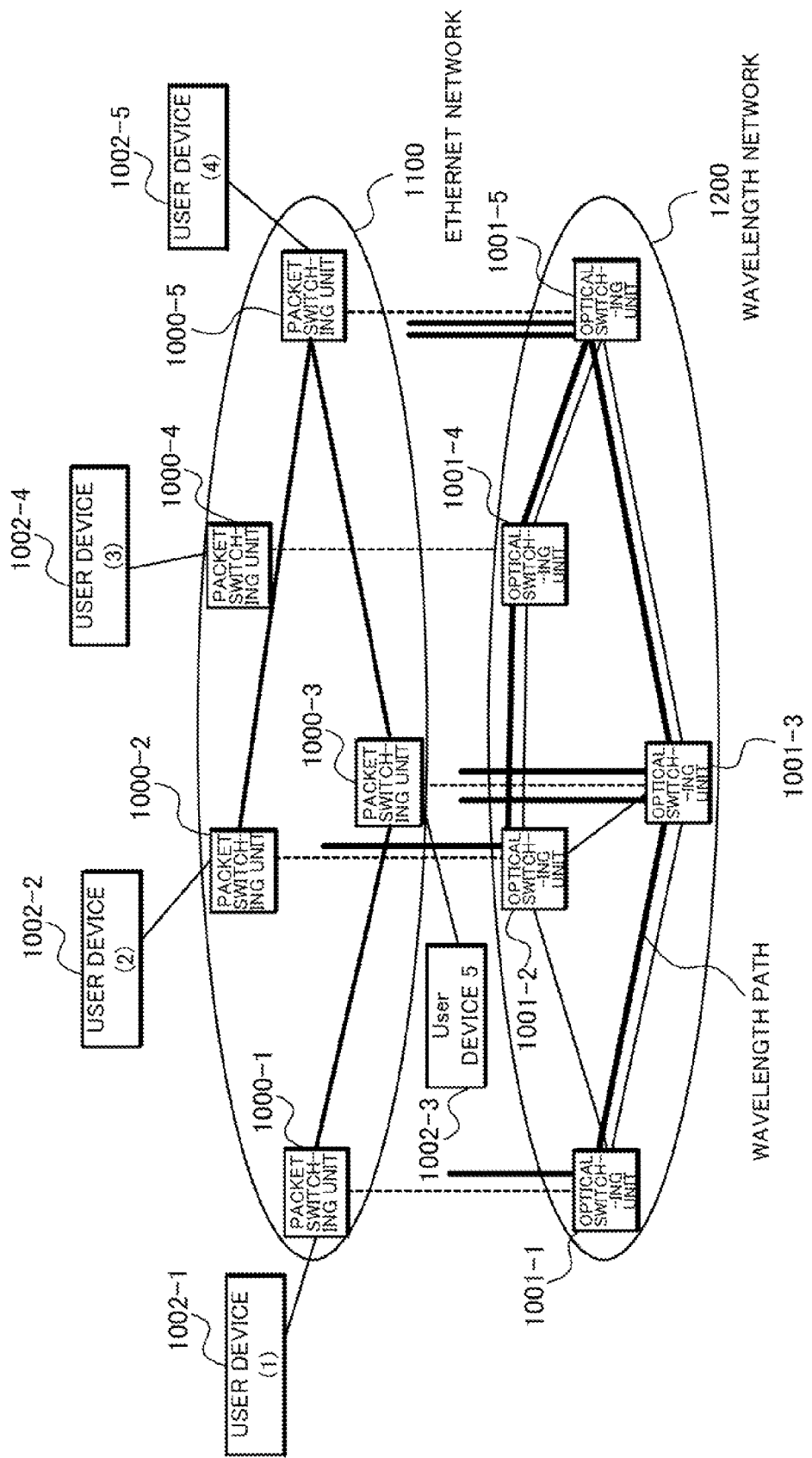
FIG. 14 is a block diagram showing one example of a network structure according to the related art.

Next, an example of a hardware structure of the communication device 120 will be described with reference to FIG. 13. FIG. 13 is a block diagram showing an example of a hardware structure of the communication device 120.

With reference to FIG. 13, the communication device 120, which can be realized by the same hardware structure as that of a common computer device, comprises a CPU (Central Processing Unit) 601, a main storage unit 602 formed of such a memory as a RAM (Random Access Memory) for use as a data working region or a data temporary saving region, a communication unit 603 (equivalent to the IP control unit 210, the optical switching unit 220 and the packet switching unit 230) which transmits and receives data through a network, an input/output interface unit 604 connected to an input device 605, an output device 606 and a storage device 607 to transmit and receive data, and a system bus 608 which connects each of the above-described components. The storage device 607 is realized, for example, by a hard disk device formed of a non-volatile memory such as a ROM (Read Only Memory), a magnetic disk and a semiconductor memory.

The communication device 120 according to the present exemplary embodiment has its operation realized not only in hardware by mounting a circuit part as a hardware part such as an LSI (Large Scale Integration) having a program incorporated but also in software by storing a program which provides each function of the IP control unit 210 or the packet switching unit 230 in the subsidiary storage unit 607 and loading the program into the main storage unit 602 to execute the same by the CPU 601.

As described in the foregoing in the three of the first to third exemplary embodiments, in a network in which connection type communication and connectionless type communication coexist, it is possible to provide a control linkage method and a network system which realize automatic and stable network operation.

Although each of the above-described exemplary embodiments uses the Ethernet as a connectionless type communication network, it is not limited to the Ethernet but is applicable to other connectionless type packet exchanging technique such as MPLS (Multi-Protocol Label Switching) or IP.

The present invention is applicable to such use of automatic linkage of a network having connection type communication and connectionless type communication coexisting.

Although the present invention has been described with respect to the preferred modes of implementation and exemplary embodiments in the foregoing, the present invention is not necessarily limited to the above-described modes of implementation and exemplary embodiments but can be modified without departing from the scope of its technical idea.

INCORPORATION BY REFERENCE

This application is based upon and claims the benefit of priority from Japanese patent application No. 2009-068374, filed on Mar. 19, 2009, the disclosure of which is incorporated herein in its entirety by reference.

What claimed is:

1. A communication network system including a connectionless type communication network and a connection type communication network, wherein a communication device forming said communication network comprising:
- a unit which transfers in-band, which means the same line as that of main signal traffic, control information, which is information exchanged between said communication devices to control said connectionless type communication network, to be exchanged on an in-band of said connectionless type communication network to other communication device through a virtual control link generated on an IP control network for controlling said connection type communication network and exchanges said in-band control information with other communication device;
- a unit which determines whether to generate a new connection for said connection type communication network based on said in-band control information to be exchanged; and
- a unit which generates a new connection for said connection type communication network in response to an instruction from said determination unit,
- wherein said determination unit, when receiving said in-band control information including an ACK returned from said other communication device having received said in-band control information, refers to an IP address of said other communication device to determine to generate a new connection for said connection type communication network between said communication device and said other communication device.

2. The communication network system according to claim 1, wherein
said in-band control information is BPDU (Bridge Protocol Data Unit) information including cost information for generating a transfer tree, which is a path/route alone which traffic is forwarded, in an Ethernet network, and
said determination unit of said communication device having received said in-band control information through said connection and said virtual control link
calculates cost between a transmission end and a reception end of said in-band control information and converts the calculated cost into cost in the Ethernet network according to a policy set in advance, and when the converted cost is smaller than the calculated cost, determines to generate a new connection for said connection type communication network between the transmission end and the reception end of said in-band control information.

3. The communication network system according to claim 1, wherein said communication device multiplexes said in-band control information with a control message of an IP control protocol which controls said connection type communication network to exchange said in-band control information with other adjacent communication device.

4. The communication network system according to claim 3, wherein said in-band control information is broadcast information for finding said communication device as an end point of the Ethernet network and said IP control protocol is an OSPF routing protocol.

5. The communication network system according to claim 3, wherein said in-band control information is BPDU (Bridge Protocol Data Unit) information including cost information for generating a transfer tree, which is a path/route alone which traffic is forwarded, in the Ethernet network and said IP control protocol is an OSPF routing protocol.

6. The communication network system according to claim 1, comprising a unit which in advance generates a tunnel, which tunnel capsules said in-band control information by an IP packet and transfers all said in-band control information transparently through said tunnel, wherein the unit which exchanges said in-band control information exchanges said in-band control information with an adjacent communication device by using said tunnel.

7. The communication network system according to claim 1, wherein said connectionless type communication network is the Ethernet and said connection type communication network is a wavelength path switching network.

8. The communication network system according to claim 1, wherein said connectionless type communication network and said connection type communication network are both the Ethernet.

9. A network linkage method for a communication device of a network communication system formed of a connectionless type communication network and a connection type communication network, comprising, as performed by the communication device:
exchanging in-band, which means the same line as that of main signal traffic, control information, which is information exchanged between said communication devices to control said connectionless type communication network, to be exchanged on an in-band of said connectionless type communication network between said communication devices through a virtual control link generated on an IP control network for controlling said connection type communication network;
determining whether to generate a new connection for said connection type communication network based on said in-band control information to be exchanged; and
determining to generate a new connection for said connection type communication network between said communication devices and said other communication device by referring to an IP address of said other communication devices when receiving said in-band control information including an ACK returned from said other communication device having received said in-band control information.

10. The network linkage method according to claim 9, wherein
said in-band control information is BPDU (Bridge Protocol Data Unit) information including cost information for generating a transfer tree, which is a path/route alone which traffic is forwarded, in an Ethernet network, and
said communication device having received said in-band control information through said connection and said virtual control link
calculates cost between a transmission end and a reception end of said in-band control information and converts the calculated cost into cost in the Ethernet network according to a policy set in advance, and when the converted cost is smaller than the calculated cost, determines to generate a new connection for said connection type communication network between the transmission end and the reception end of said in-band control information.

11. The network linkage method according to claim 9, wherein said communication device multiplexes said in-band control information with a control message of an IP control protocol which controls said connection type communication network to exchange said in-band control information with other adjacent communication device.

12. The network linkage method according to claim 11, wherein said in-band control information is broadcast information for finding said communication device as an end point of the Ethernet network and said IP control protocol is an OSPF routing protocol.

13. The network linkage method according to claim 11, wherein said in-band control information is BPDU (Bridge Protocol Data Unit) information including cost information for generating a transfer tree, which is a path/route alone which traffic is forwarded in the Ethernet network and said IP control protocol is an OSPF routing protocol.

14. The network linkage method according to claim 11, comprising a unit which in advance generates a tunnel and transfers all said in-band control information transparently through said tunnel, wherein
said unit exchanges said in-band control information exchanges said in-band control information with an adjacent communication device by using said tunnel.

15. The network linkage method according to claim 9, wherein said connectionless type communication network is the Ethernet and said connection type communication network is a wavelength path switching network.

16. The network linkage method according to claim 9, wherein said connectionless type communication network and said connection type communication network are both the Ethernet.

17. A communication device forming a network communication system including a connectionless type communication network and a connection type communication network, comprising:
a unit which transfers in-band, which means the same line as that of main signal traffic, control information, which is information exchanged between said communication devices to control said connectionless type communication network to be exchanged on an in-band of said connectionless type communication network to other communication device through a virtual control link generated on an IP control network for controlling said connection type communication network and exchanges said in-band control information with other communication device;
a unit which determines whether to generate a new connection for said connection type communication network based on said in-band control information to be exchanged; and
a unit which generates a new connection for said connection type communication network in response to an instruction from said determination unit, wherein said determination unit, when receiving said in-band control information including an ACK returned from said other communication device having received said in-band control information, refers to an IP address of said other communication device to determine to generate a new connection for said connection type communication network between said communication device and said other communication device.

18. A non-transitory computer readable-medium storing a program operable on a computer device forming a network communication system including a connectionless type communication network and a connection type communication network, wherein said program causes said computer device to execute
a processing of transferring in-band, which means the same line as that of main signal traffic, control information, which is information exchanged between communication devices forming the network communication system to control said connectionless type communication network, to be exchanged on an in-band of said connectionless type communication network to other communication device through a virtual control link generated on an IP control network for controlling said connection type communication network and exchanging said in-band control information with other communication device,
a processing of determining whether to generate a new connection for said connection type communication network based on said in-band control information to be exchanged;
a processing of generating a new connection for said connection type communication network;
a processing of determining to generate a new connection for said connection type communication network between said communication devices and said other communication device by referring to an IP address of said other communication device when receiving said in-band control information including an ACK returned from said other communication device having received said in-band control information.

* * * * *